(12) United States Patent
Laurent

(10) Patent No.: US 7,835,228 B2
(45) Date of Patent: Nov. 16, 2010

(54) MODEM AND METHOD FOR TRANSMITTING DATA IN A MEDIUM NOTABLY SUCH AS AIR AND WATER

(75) Inventor: Pierre-Andre Laurent, Bessancourt (FR)

(73) Assignee: Thales (FR)

( * ) Notice: Subject to any disclaimer, the term of this patent is extended or adjusted under 35 U.S.C. 154(b) by 1 day.

(21) Appl. No.: 12/094,982

(22) PCT Filed: Nov. 24, 2006

(86) PCT No.: PCT/EP2006/068892

§ 371 (c)(1),
(2), (4) Date: Oct. 30, 2008

(87) PCT Pub. No.: WO2007/060221

PCT Pub. Date: May 31, 2007

(65) Prior Publication Data

US 2009/0219786 A1 Sep. 3, 2009

(30) Foreign Application Priority Data

Nov. 25, 2005 (FR) .................................. 05 11967

(51) Int. Cl.
*H04B 11/00* (2006.01)
*H04L 27/26* (2006.01)
(52) U.S. Cl. ...................................................... 367/134
(58) Field of Classification Search .................. 367/134
See application file for complete search history.

(56) References Cited

U.S. PATENT DOCUMENTS 4,275,398 A 6/1981 Parker et al.
5,784,339 A * 7/1998 Woodsum et al. ........... 367/134
6,130,859 A 10/2000 Sonnenschein et al.
6,512,720 B1 * 1/2003 Yang ........................... 367/134
7,447,117 B2 * 11/2008 Yang ........................... 367/134
2004/0090865 A1 5/2004 Davies et al.

(Continued)

FOREIGN PATENT DOCUMENTS

EP 1566936 8/2005

(Continued)

OTHER PUBLICATIONS

Leblanc L. R. et al. "Chirp FSK Modem for High Reliability Communication in Shallow Water." Oceans '99 MTS/IEEE. Riding the Crest Into the 21st Century Seattle, vol. 1, Sep. 13, 1999, pp. 222-227, XP010354714, Piscataway, NJ, USA & Washington, DC, US, ISBN: 0-7803-5628-4.

(Continued)

*Primary Examiner*—Dan Pihulic
(74) *Attorney, Agent, or Firm*—Lowe Hauptman Ham & Berner, LLP

(57) ABSTRACT

A method for transmitting data is disclosed having the following steps: emitting packets of at least two types: pure data (long packets) and acknowledgments of receipt (acknowledgment) (short packets). Each packet is formed of three components: a—an acquisition preamble, (1) for presence detection and the joint determination of the initial values of the time shift and of the frequency shift, and b—the data proper, (2) and c—a set of unmodulated fixed carriers (3) making it possible to permanently estimate the frequency shift.

10 Claims, 7 Drawing Sheets

U.S. PATENT DOCUMENTS

2009/0067562 A1* 3/2009 Laurent ............ 375/371
2009/0219786 A1* 9/2009 Laurent ............ 367/134

FOREIGN PATENT DOCUMENTS

EP 1594330 11/2005
WO WO9619056 6/1996

OTHER PUBLICATIONS

Dunn S. M. et al. "A Real-Time High Data Rate Acoustic Communications Receiver Demonstration System." OCeans 2000 MTS/IEEE Conference and Exhibition, vol. 1, Sep. 11, 2000, pp. 385-390, XP010520457, IEEE, Piscataway, NJ, USA, ISBN: 0-7803-6551-8.

* cited by examiner

Autocorrelation of A

Autocorrelation of B

Intercorrelation of A and B

MODEM AND METHOD FOR TRANSMITTING DATA IN A MEDIUM NOTABLY SUCH AS AIR AND WATER

CROSS-REFERENCE TO RELATED APPLICATIONS

The present Application is based on International Application No. PCT/EP2006/068892, filed on Nov. 24, 2006, which in turn corresponds to French Application No. 05 11967 filed on Nov. 25, 2005, and priority is hereby claimed under 35 USC §119 based on these applications. Each of these applications are hereby incorporated by reference in their entirety into the present application.

FIELD OF THE INVENTION

The invention relates notably to a modem and a method making it possible to transmit data in a medium such as the marine medium or else air. It thus relates to an acoustic modem for underwater transmissions and its associated method. It is also aimed at data transmissions in air, via ultrasound waves, for example.

DESCRIPTION OF THE PRIOR ART

The problem posed is notably the transmission of data of any type between two corresponding parties immersed in a given medium such as water and at a throughput of several hundred bits per second while using as small as possible a bandwidth and a calculation power reduced to the minimum, in particular for autonomous equipment operating with batteries.

The electromagnetic waves conventionally used (from a few hundred kHz to a few GHz) propagating extremely poorly in water, the modem (modulator-demodulator) therefore uses acoustic waves to transport the messages transmitted.

It should be recalled that the underwater medium has an extremely complex behavior in respect of acoustic waves. Because of its inhomogeneities (salinity, temperature, currents, etc.) the path followed by the waves is a straight line only for very short distance and this path varies over time.

The waves which reach the receiver may follow several paths with very different delays. These paths can be either "direct" (several different routes converging towards the receiver), or "indirect" (reflections on the surface of the water, possibly perturbed by waves, as well as on the bottom which can have all sorts of types of reliefs).

In practice, this results in the arrival at the receiver of numerous replicas of the signal emitted, each having at a given instant its own amplitude, phase, delay and frequency shift.

To this should possibly be added a frequency shift due to the relative radial speed of the corresponding parties (Doppler effects) as well as a pseudoperiodic frequency shift due to the swell in the case where one at least of the opposite parties is on the surface.

In certain cases, there is a need for almost perfect reliability of transmission. If it is a text, it is possible to tolerate several isolated errors, because they will be corrected automatically by the reader. When a binary file is involved (for example a JPEG image), the required is approximately error rate to 0, otherwise the image will be very degraded.

Moreover, the system is "wideband".

In practical applications, the bandwidth of the signal emitted is not negligible compared with the central emission frequency. The Doppler shift being proportional to frequency, the low frequencies have a smaller frequency shift than the high frequencies.

What is more, since the relative speed of the emitter and of the receiver is not always negligible with respect to the speed of sound in water (about 1500 m/s), a time dilation or contraction effect is observed, according to the sign of the relative speed.

For example, a message emitted for a duration of 10 s will be received in 10.13 seconds if the separation speed is +10 m/s (36 km/h or about 20 knots) thereby posing synchronization tracking problems.

Systems of "spread spectrum" type, in which the useful flow rate is very low compared with the bandwidth used, are known from the prior art.

These systems consist in over-modulating (spreading) the useful binary train (at a few tens of bits per second) by another much faster binary train known to both corresponding parties in such a way that its bandwidth is at least several tens (if not hundreds) of times the band theoretically necessary.

By well known procedures for "correlation" and estimation of the frequency shift (Doppler compartment) the receiver attempts to despread the signal received by the known binary train so as to isolate one (or a few) of the replicas of the message having the best quality so as to decode the content thereof.

One of the drawbacks of systems of this type is their low spectral efficiency (wide band, low throughput) and the complexity of the systems for initial detection (acquisition) under non-trivial propagation conditions.

SUMMARY OF THE INVENTION

The invention relates to a method for transmitting data, characterized in that it comprises at least the following steps: emitting packets of at least two types: pure data (long packets), acknowledgments of receipt (acknowledgment) (short packets), each packet is formed of three components:
- a—an acquisition preamble, for presence detection and the joint determination of the initial values of the time shift and of the frequency shift,
- b—the data proper,
- c—a set of unmodulated fixed carriers making it possible to permanently estimate the frequency shift.

The acquisition preamble is, for example, formed of a set of pulses of finite duration spaced apart by at least a minimum duration Tg; to transmit the data, in step b), the signal emitted consists of N regularly spaced carriers modulated independently and in a synchronous manner; the fixed carriers can have an amplitude greater than those conveying the data.

The pulses of the acquisition preamble are, for example, non-linear frequency ramps, rising or falling "hyperbolic chirps" whose characteristics are fixed by their duration and the extreme frequencies used (minimum and maximum).

The pulses of the acquisition preamble can be amplitude modulated as a function of the instantaneous frequency so as to obtain an almost "flat" frequency spectrum.

Two types of pulses are used for example to distinguish between data messages and acknowledgment messages.

It is possible to use a modulation of differential type, with 2 or 4 phase states.

Reference symbols of known phases are, for example, inserted at known positions.

The phase reference symbols may have a higher power than the unknown symbols on condition that their phases are properly chosen.

It is possible to use a position code corresponding to a polynomial P(d) such that the product P(d)*P(1/d) has coefficients of nonzero degree equal to 0 or 1.

Binary codes, for example, are used.

The method exhibiting the above characteristics is, for example, used for acoustic transmissions of data in a medium suitable for conveying said waves, namely the underwater medium, air, rock, etc.

The invention exhibits notably the following advantages:

The proposed solution is of low complexity,

It is based on one of the large categories of modems which have proven themselves in conventional radio transmissions, namely a parallel modem.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DESCRIPTION OF THE PREFERRED EMBODIMENTS

In order to better understand the subject of the invention, the description which follows relates to an acoustic modem for the underwater transmission of data. The explanations can however apply in respect of devices for transmitting data in air using ultrasound waves. The operating principle of this modem is comparable with that of a parallel modem known to the person skilled in the art. The duration for which the phases/amplitudes are constant is called a symbol and has a duration Ts. A symbol is composed of two parts:

A "useful" part of duration Tu, which conveys the information to be transmitted (defined by the choice of the phase and/or of the amplitude), A "guard time" of duration Tg whose role is to allow all the replicas of the signal to combine so as to give a stable and demodulatable signal of duration Tu.

The duration of the symbol is simply the sum of Tu and Tg.

Figure 1:
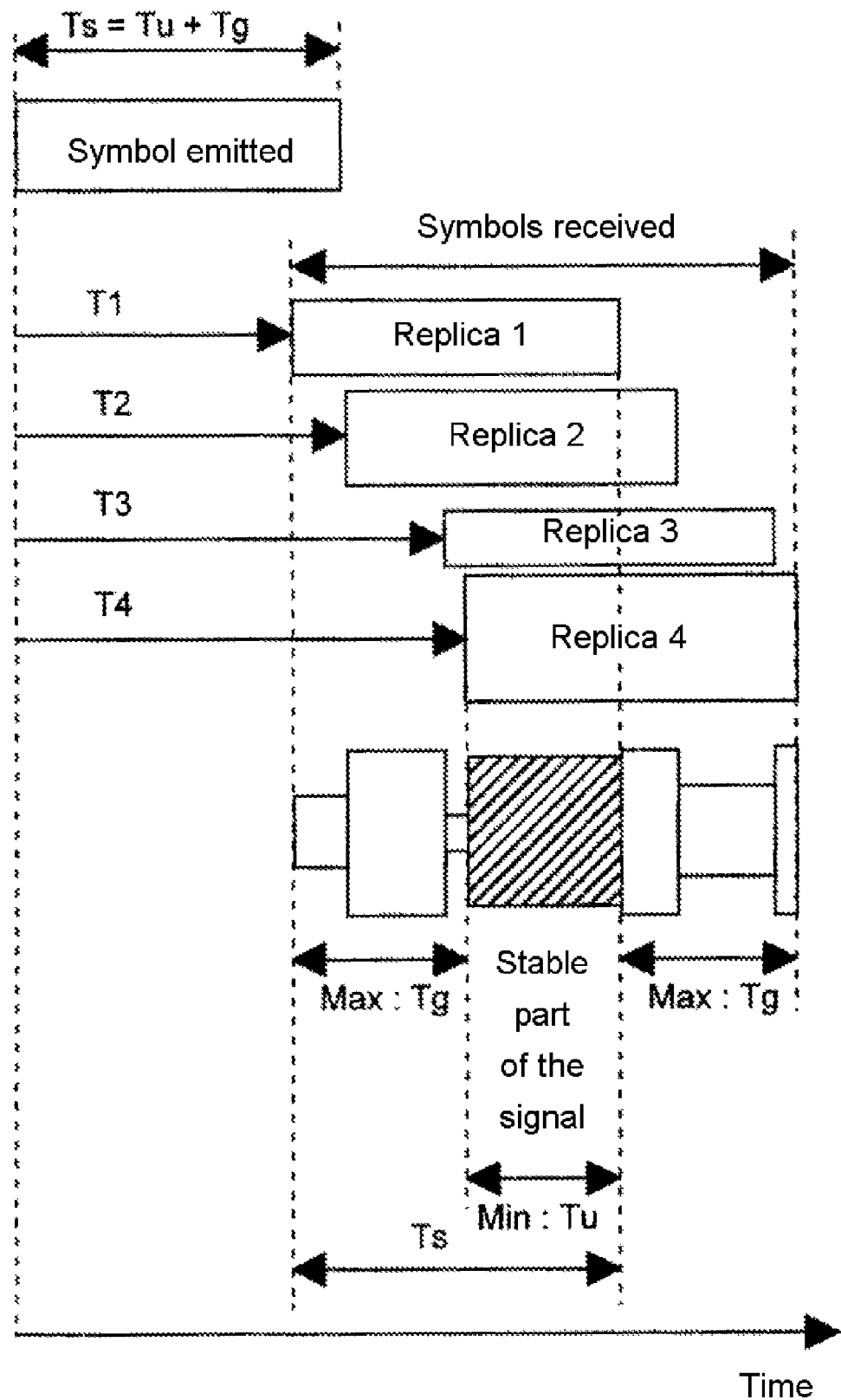
FIG. 1 a diagram of the detection of signals in the case of a parallel modem.
Figure 2:
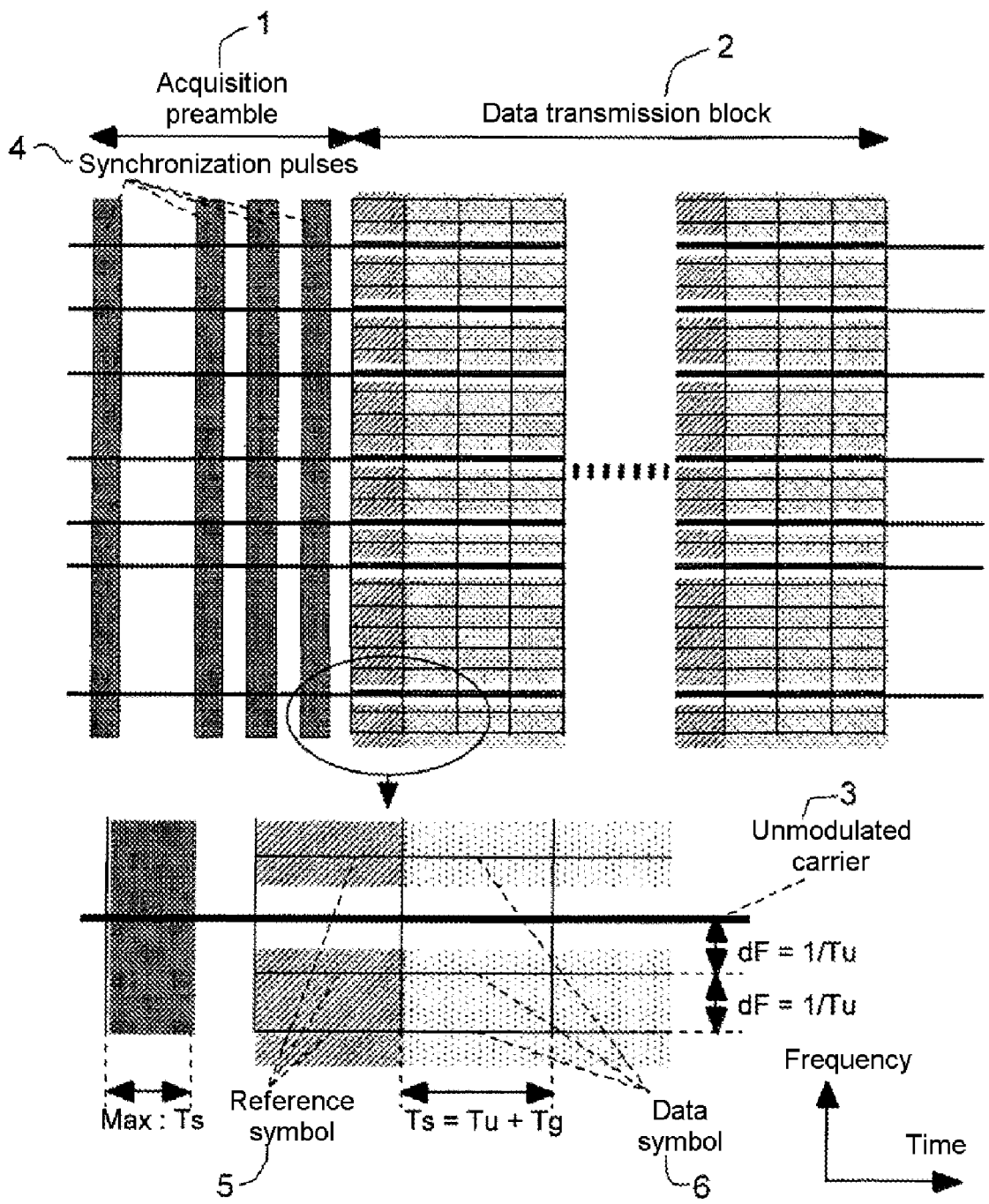
FIG. 2, the structure of a data packet generated following the method according to the invention, FIG. 3, an illustration of several collections of frequencies and of their distortion, FIG. 4, in a time-frequency chart, the signal emitted, and FIGS. 5 to 13, several examples of synchronization patterns and the graphical representation of their autocorrelation.
Figure 3:
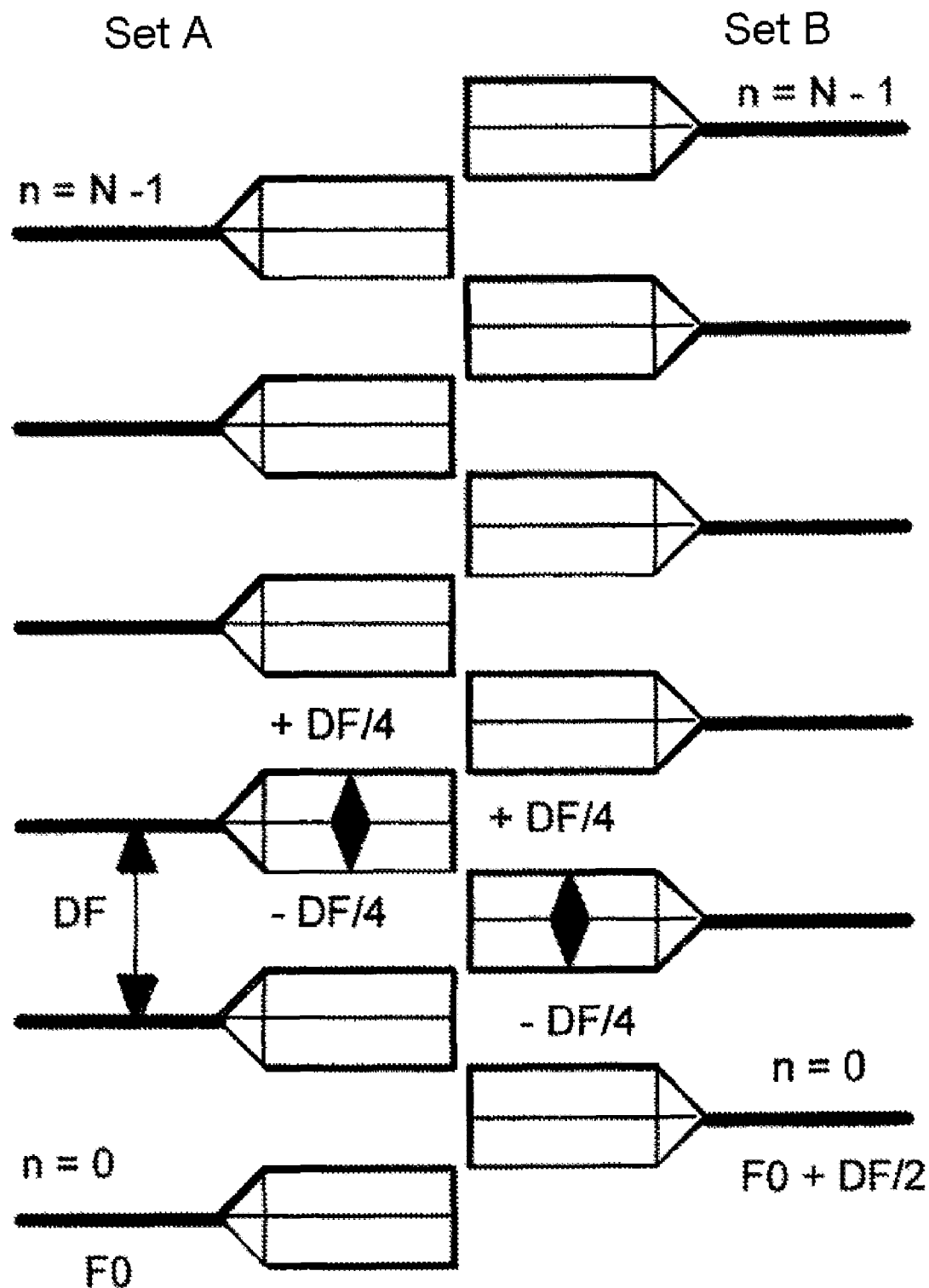

FIG. 1 shows diagrammatically an exemplary use of such a modem for a channel with 4 distinct paths.

This figure reveals that, so long as the difference in the arrival times of the various replicas remains less than Tg, there always exists a signal portion of minimum duration Tu that can be processed by the receiver.

Moreover, the "tailoff" of the nth symbol has a maximum duration of Tg and will therefore be superimposed on the start of the perturbed part of the n+1th symbol without disturbing the latter.

The frequency offset between carriers is a multiple of the inverse of Tu, i.e. dF=k/Tu. This is the condition whereby, when the receiver is properly synchronized, the signals detected on the N carriers are completely independent of one another.

The modem and the method according to the invention rely notably on the following idea: transmission is effected through packets of fixed or variable duration that is optimized according to the system assumptions which define in particular the range of the emitters/receivers therefore the maximum duration of propagation.

The invention relates notably to a system for acoustically transmitting underwater data comprising at least one module suitable for emitting packets (bursts) of at least two types: pure data (long packets), acknowledgments of receipt (acknowledgments, short packets).

Each packet of long packet type or of short packet type is formed of three components:

a—an acquisition preamble, 1, for presence detection and the joint determination of the initial values of the time shift and of the frequency shift; this initial part intended for receiver lock-on makes it possible to define the instant of arrival of the message and its global frequency shift; this acquisition preamble is formed of a series of pulses of shapes and instants of emission that are known to the receiver, b—the data proper, 2; part during which the receiver must at one and the same time continuously adjust its evaluation of the Doppler shift and its evaluation of the instant of arrival of the message and attempt to demodulate the data received, c—a set of unmodulated fixed carriers, 3, making it possible to permanently estimate the frequency shift.

A series of pulses is emitted at very precise instants so as to guarantee optimal acquisition.

In the case where very reliable transmission is required, two types of message are envisaged:

Pure data messages, conveying the useful information,

Acknowledgment of receipt messages, intended to indicate to the emitter whether reception was performed correctly so that it can retransmit the parts of the message which have been poorly received.

a—The acquisition preamble 1 is formed of a set of pulses 4 of finite duration spaced apart by at least a minimum duration Tg.

These pulses are for example rising or falling non-linear frequency ramps ("hyperbolic chirps") whose characteristics are fixed by their duration and the extreme frequencies used.

These pulses are amplitude modulated as a function of the instantaneous frequency so as to obtain an almost "flat" frequency spectrum.

The choice of the nature and position of each pulse is, by construction, known to the receiver and must be optimized to obtain the best performance. Optimization is for example carried out by simulation, by testing all the possibilities and retaining the best one or best ones.

b—The data are transmitted according to the well-known method of the parallel modem which assumes that the signal emitted consists of N regularly spaced carriers modulated independently and in a synchronous manner (symbols).

The data comprise reference symbols 5 and data symbols 6. The duration of the symbol is as previously Ts.

The modulation is of differential type, with 2 or 4 phase states according to the robustness required.

At regular intervals are disposed symbols whose phases are fixed and known so as to initiate (or reinitiate) the differential demodulation. These phases are optimized so as to obtain a quasi-constant amplitude of the signal emitted, thereby making it possible to temporarily increase the amplitude of the individual carriers so as to obtain "solid" references.

The phases giving the best result follow a quadratic law as a function of frequency.

c—The fixed carriers are of greater amplitude than those conveying the data. This is highly recommended so as to limit the influence of the neighboring carriers on the quality of estimation of the frequency shift.

Their phases are optimized to minimize the "peak factor" of the whole set (ratio of the maximum instantaneous power to the mean power).

Various types of modulation and synchronization patterns that can be used will now be detailed.

Modulation Type

Innumerable modulation systems of variable complexities and flow rate exist which can be used in the method and the system according to the invention. The expression "modulation system" is understood to mean a method which, on the basis of a binary train, unambiguously defines the amplitude and the phase to be applied to a given carrier at a given instant.

In this exemplary implementation, the signal received (i.e. its demodulatable part) possibly being the superposition of a large number of replicas all having independent phases and amplitudes, neither the value of the amplitude nor that of the phase are significant, since it is in practice impossible to estimate the gain (complex: gain and phase shift) of the channel at each symbol and at each frequency.

On the other hand, if the rate of variation of the gain and of the delay of each path varies little from one symbol to another, it is possible to utilize the phase difference between two successive symbols.

A differential phase modulation will therefore be used:
  either with 2 states if the channel is highly perturbed (phase variation of 0 or 180°),
  or with 4 states (phase variation of 0, +90°, −90° or 180°) if it is less so.

For N data carriers, there will thus be N or 2 N new bits at each symbol.

If the guard time Tg is equal to the useful duration (Tg=Tu) this corresponds (for 2 states) to a raw rate of N bits in a symbol duration Ts in a bandwidth of around N/Tu, i.e. 0.5 bits/s per Hz: a signal with 3 KHz of band will be able to convey at most 1.500 b/s (3000 b/s for 4 states).

Of course, the net rate will be smaller than that announced above because of the packet-based emission, and of the essential addition of error detector/corrector codes to the useful data and of ancillary signals (packet number, etc.) that are highly protected.

Note that it is necessary to have a reference initial symbol for which all the phases are fixed so as to initiate the demodulation process which will consist in measuring the phase difference between two successive symbols (on a given carrier) so as to deduce therefrom the information emitted.

If required, this reference symbol may be repeated at regular intervals so as to "retune" the receiver.

Synchronization Pulses

Within the framework of the example with regard to underwater transmission (wide band), the initial synchronization is based on the emission of pulses modulated in frequency and in amplitude in such a way that:

(1) the frequency spectrum is as regular ("flat") as possible, (2) the detection is always of the same quality that is to say always gives a maximum amplitude as detector output, whatever the Doppler shift with the associated temporal contraction/dilation effect.

Condition (1) leads naturally to the use of a signal which is a frequency "ramp", that is to say the signal traverses the entire band of the frequencies used (from F0 to F1). This type of signal is commonly dubbed a "chirp" and often used in the field of radar.

Condition (2) requires the employment of a non-linear frequency variation called a "hyperbolic chirp" where the value of the frequency is a hyperbolic function of time and not a linear function as in simple chirps.

This function f(t) is the following:

$$f(t) = \frac{F0 F1 T}{F0t - F1t + F1T}$$

where T is the duration of the pulse emitted less than or equal to Tu.

As the signal does not sweep all the frequencies between F0 and F1 at a constant rate, its spectral power density is not constant and therefore requires a complementary amplitude modulation to obtain a flat spectrum.

The instantaneous amplitude of the signal will therefore be higher just where the frequency variation is fastest.

It is easily shown that the amplitude must be proportional to the square root of the derivative of the frequency with respect to time, i.e., here, very simply proportional to the instantaneous frequency.

$$\sqrt{\left|\frac{\partial f(t)}{\partial t}\right|} = \frac{\sqrt{F0 F1 |-F0 + F1|T}}{|F0t - F1t + F1T|} \alpha f(t)$$

Presence detection is done by correlating the signal received with its replica limited to the frequency span which is systematically received whatever the Doppler shift.

Figure 4:
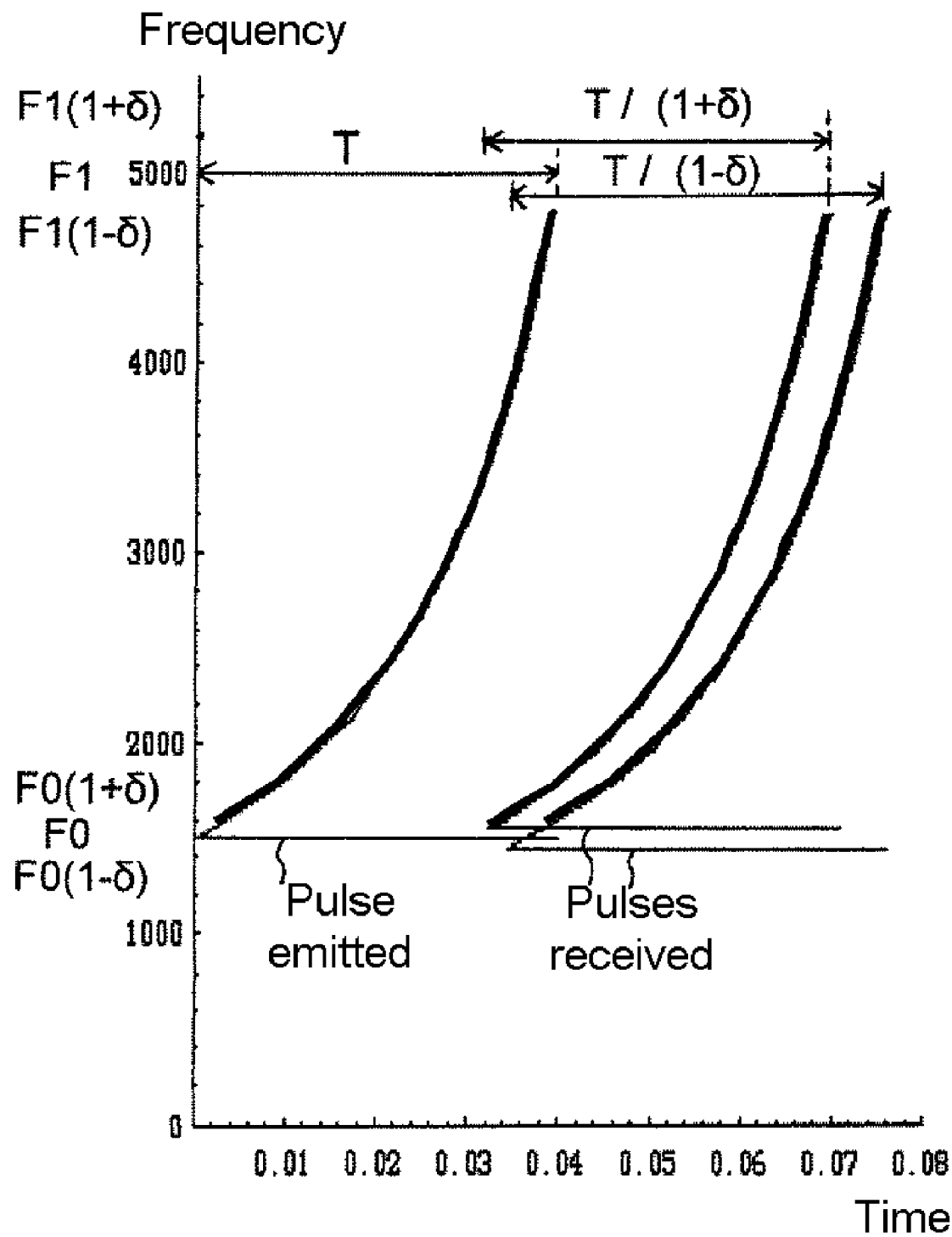

FIG. 4 shows the time-frequency chart of the signal emitted, with F0=1500 Hz, F1=5000 Hz and T=40 ms. It also shows the charts of the signal received at 50 m. for a relative speed of +50 m/s and −50 m/s. The Doppler shift coefficient □ is dependent on this relative speed and equals 0 if it is zero.

Its exact value is:

$$\delta = \frac{v_r(R) - v_r(E)}{C - v_r(R)}$$

C: speed of sound in water $v_r(E)$: radial speed of the emitter $v_r(R)$: radial speed of the receiver Reference frame: the water, assumed motionless The thick curve in triplicate is the signal which remains unchanged whatever the frequency shift, and which is therefore used as reference in the acquisition correlators charged with individually processing each pulse.

It should be noted that if the values of F0 and F1 (falling chirp) are exchanged, it suffices to exchange the start and end of the pulses to get the result.

Other beneficial point: the intercorrelation between the rising chirps (F1>F0) and the falling chirps (F0>F1) is particularly weak, thereby making it possible to very easily discern the two types of pulses.

Synchronization Pattern

First of all, the pulses must be spaced apart by at least one duration Tg to avoid the overlapping of the responses of the correlators of the receiver at two successive pulses.

Position Code

One of the possible variants is a "position code" having an aperiodic autocorrelation equal to 0 or 1 everywhere except at the instant of synchronization where this autocorrelation equals N if there are N pulses.

Figure 5:
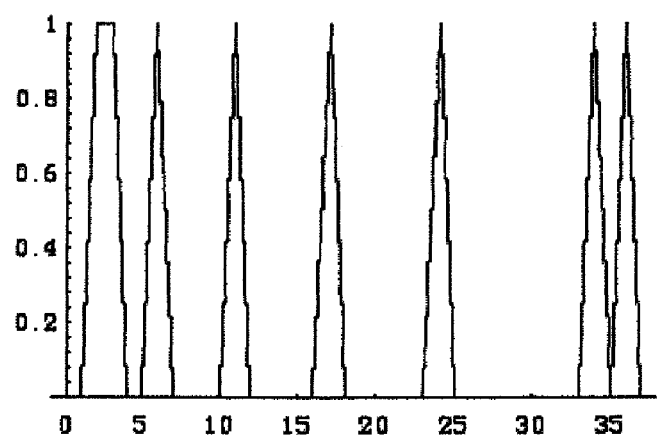

Such a code can for example be represented by a polynomial of the type:

$$P(d)=1+d^4+d^9+d^{15}+d^{22}+d^{32}+d^{34}$$

where the operator $d^n$ corresponds to a pulse at position n. This code can also be represented in graphical form (FIG. 5).

Figure 6:
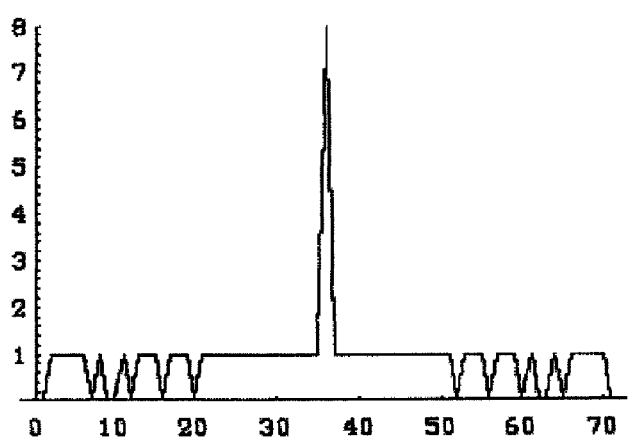

As regards its autocorrelation, the simplest representation is graphical (FIG. 6). It clearly shows the main correlation spike on which a good detection will be made, knowing that all the side lobes are negligible.

This autocorrelation is the graphical representation of the product P(d) P(1/d) which models the correlation process to be performed.

A good position code corresponds for example to a polynomial P(d) such that the product P(d) P(1/d) has coefficients of nonzero degree equal to 0 or 1.

The distinction between the two types of messages (message containing the data or else acknowledgment message) will be able to be made by using either rising chirps only, or falling chirps only.

Figure 7:
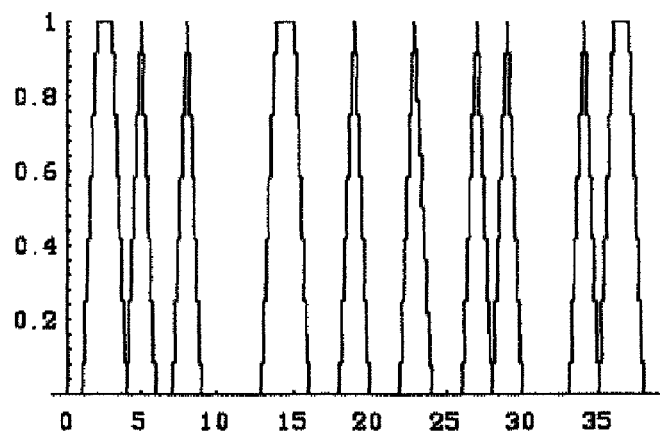
Figure 8:
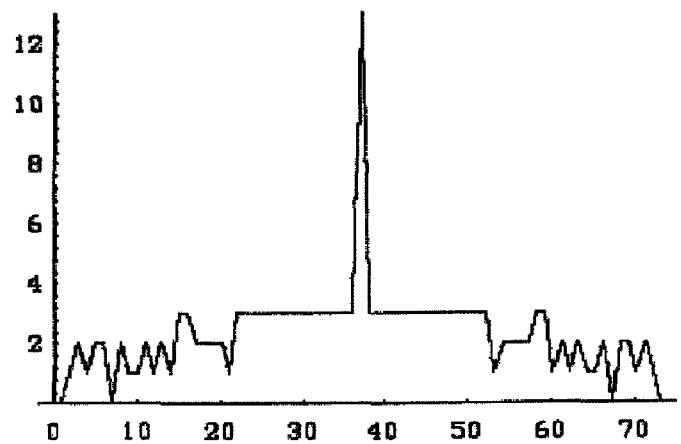

To improve performance, it is possible to accept slightly higher side lobes:

$$P(d)=1+d+d^3+d^6+d^{12}+d^{13} \ldots +d^{35}$$

as with (13 nonzero coefficients, therefore correlation spike equal to 13) representable by FIG. 7 and whose autocorrelation is as follows (max. 3 side lobes) FIG. 8.

Binary Codes

Unique Sequence

Another possibility is to make use of a binary sequence having excellent autocorrelation properties.

In this case, the pulses are emitted at regular intervals.

The 0 bits of the sequence result in chirps of a given type, and the 1 bits in chirps of the other type.

It is possible to take as example a Barker sequence of 13 bits, constituted thus:

{0, 1, 0, 1, 0, 0, 1, 1, 0, 0, 0, 0, 0}

Or, in another form:

{−1, +1, −1, +1, −1, −1, +1, +1, −1, −1, −1, −1, −1}

Figure 9:
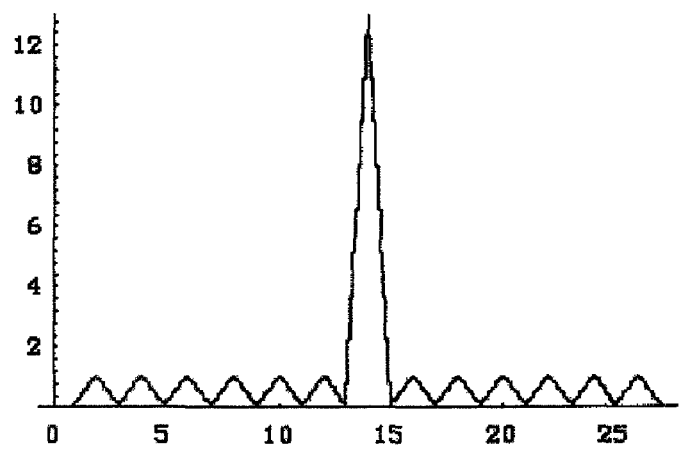

Its autocorrelation then has the form of the signal of FIG. 9.

Figure 10:
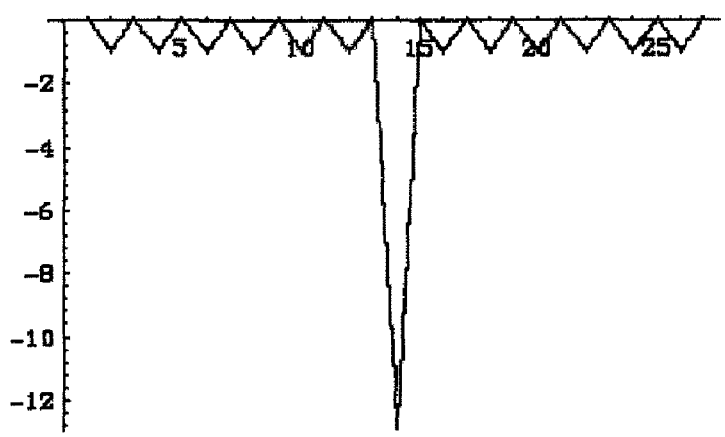

If this same sequence is emitted while inverting all the bits (by exchanging rising and falling chirps), the output of the correlator is inverted, as in FIG. 10.

It is then possible to emit either the original sequence, or the inverted sequence to distinguish the two types of messages as a function of the polarity of the global correlation spike.

Pair of Sequences

There exists another possibility which consists in utilizing two distinct sequences having excellent autocorrelation and intercorrelation properties.

For example, the following sequences (again 13 bits)

Sequence A={−1, +1, −1, +1, +1, −1, +1, +1, +1, −1, −1, −1, −1}

Sequence B={−1, −1, +1, −1, −1, +1, −1, −1, −1, +1, +1, +1, −1}

Their autocorrelation and intercorrelation are as follows.

Figure 11:
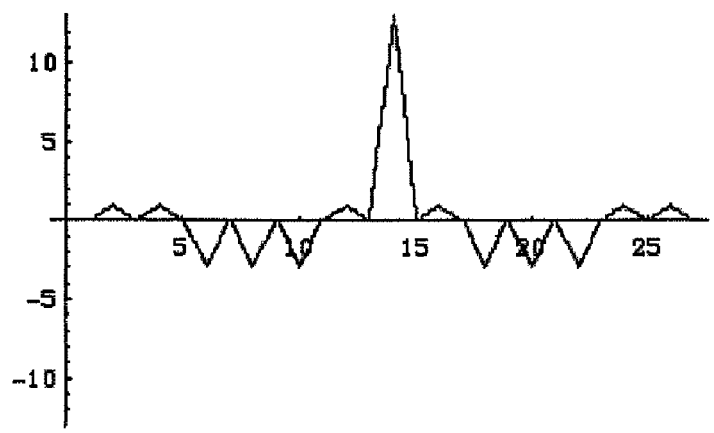
Figure 12:
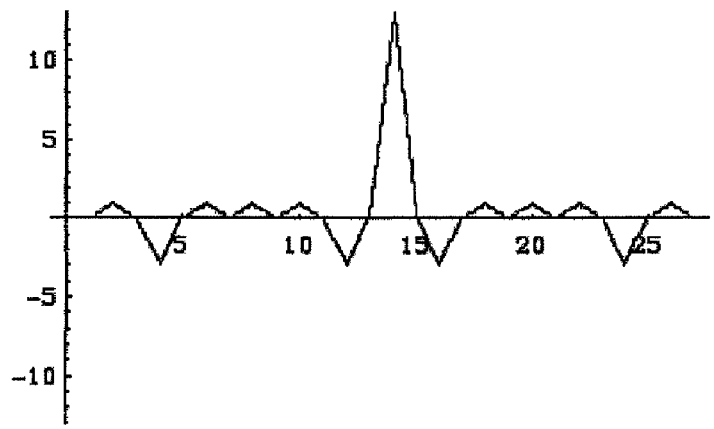
Figure 13:
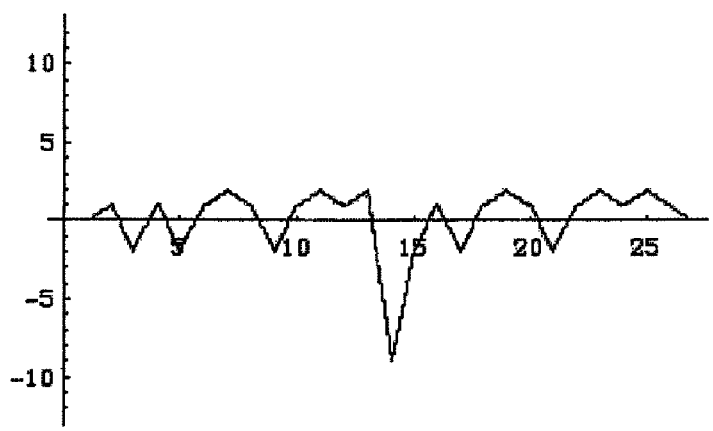

FIG. 11 corresponds to the autocorrelation of A, FIG. 12 corresponds to the autocorrelation of B and FIG. 13 to the intercorrelation of A and B.

The emission of one or the other sequence will make it possible to distinguish between the two types of messages that are possible.

Estimation of the Frequency Shift

Having regard to the variability of the channel, the estimation of the instantaneous frequency shift, performed within the framework of the present invention, relies on a "diversity" effect which consists in using a collection of P unmodulated carriers, distributed almost regularly throughout the band of the signal, instead of some of the existing carriers (to preserve orthogonality). P must be small compared with N (of the order of 10% or less) so as not to overly decrease the useful throughput of the link.

This guarantees that if a few carriers are of low level, there will practically always be others of sufficient level to compensate.

Moreover, since the estimation of the common frequency shift has to be strongly filtered, the shift estimation carriers will finish slightly after the message itself to compensate for the delay due to the filtering.

It is not essential to make them begin before the start of the message, which is the synchronization preamble previously described. Specifically, it has been rendered insensitive to the Doppler by virtue of the hyperbolic chirps and only the END thereof has to be detected, the moment at which a good estimation of the frequency is then available.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method for transmitting data between modems through a medium that transmits acoustic waves comprising the following steps: emitting from a first modem, acoustic waves in to the medium, comprising packets of at least two types, pure data, and acknowledgment of receipt messages, wherein each packet is formed of three components:

a—an acquisition preamble formed of a set of pulses of finite duration, for presence detection and a joint determination of initial values of a time shift and of a frequency shift, b—data proper, c—a set of unmodulated fixed carriers suitable for permanently estimating the frequency shift, receiving with a second modem, the acoustic waves emitted by the first modem;

demodulating the data proper with the second modem based on the acquisition preamble and the set of unmodulated fixed carriers, wherein non-linear frequency ramps, rising or falling "hyperbolic chirps" with characteristics fixed by duration and extreme frequencies used (minimum and maximum), are used for the pulses of the acquisition preamble.

2. The method as claimed in claim 1, wherein:

a—the pulses of the acquisition preamble are of finite duration spaced apart by at least a minimum duration Tg, b—to transmit the data, a signal consisting of N regularly spaced carriers modulated independently and in a synchronous manner is emitted, c—fixed carriers of greater amplitude than those conveying the data are used.

3. The method as claimed in claim 2, wherein the pulses of the acquisition preamble are amplitude modulated as a function of an instantaneous frequency to obtain an almost "flat" frequency spectrum.

4. The method as claimed in claim 1, wherein two types of pulses are used to distinguish between data messages and acknowledgment messages.

5. The method as claimed in claim 1, wherein a modulation of differential type, with 2 or 4 phase states, is used.

6. The method as claimed in claim 1, wherein reference symbols of known phases are inserted at known positions.

7. The method as claimed in claim 6, wherein reference symbols of phases having a higher power than unknown symbols are used.

8. The method as claimed in claim 2, wherein a position code corresponding to a polynomial P(d) such that the product P(d)*P(1/d) has coefficients of nonzero degree equal to 0 or 1 is used.

9. The method as claimed in claim 2, wherein binary codes are used.

10. The use of the method as claimed in claim 1 with acoustic transmissions of data in a medium suitable for conveying said waves, namely the underwater medium.

* * * * *